United States Patent [19]

Klusowski et al.

[11] Patent Number: 4,643,438

[45] Date of Patent: Feb. 17, 1987

[54] AXIAL OIL SEAL OF A ROTARY PISTON ENGINE

[75] Inventors: Hans-Jürgen Klusowski, Hergensweiler; Helmut Schönich, Kempten, both of Fed. Rep. of Germany

[73] Assignee: Wankel GmbH, Berlin, Fed. Rep. of Germany

[21] Appl. No.: 871,109

[22] Filed: Jun. 5, 1986

[30] Foreign Application Priority Data

Mar. 18, 1986 [DE] Fed. Rep. of Germany ....... 3609018

[51] Int. Cl.⁴ .................. F16J 15/34; F01C 19/02
[52] U.S. Cl. ................... 277/81 P; 277/138; 277/161; 418/142
[58] Field of Search ............ 277/81 P, 138, 139, 277/151, 157, 158, 161, 216; 418/140, 142–144

[56] References Cited

U.S. PATENT DOCUMENTS

| | | | |
|---|---|---|---|
| 1,640,155 | 8/1927 | Low | 277/138 X |
| 2,155,031 | 4/1939 | Amberg | 277/161 X |
| 2,313,395 | 3/1943 | Phillips | 277/157 |
| 3,575,541 | 4/1971 | Hamada | 277/81 P X |
| 3,947,046 | 3/1976 | Maruyama et al. | 277/81 P X |
| 4,061,447 | 12/1977 | Kato | 418/142 |
| 4,080,120 | 3/1978 | Eiermann | 277/81 P X |

Primary Examiner—Robert S. Ward
Attorney, Agent, or Firm—Becker & Becker, Inc.

[57] ABSTRACT

An axial oil seal of a rotary piston internal combustion engine of trochoidal type of construction having a housing that consists of two side plates and a two-lobed or dual-curvature mantle runway with an eccentric shaft passing through the housing and including a triangular piston upon an eccentric of the eccentric shaft such that corners of the piston are continuously in sliding engagement of the sealing parts of the gas seal rotating along the mantle runway and the housing side walls, such oil seal within the axial gas seal being arranged in a groove in the piston, which oil seal consists of at least one sealing ring having a trapezoidal shape in radial cross section and an oil-wiping or scraping edge provided with spring effect of the oil-wiping scraping edge against the housing side wall as well as a seal closing and shutting off a groove path.

4 Claims, 3 Drawing Figures

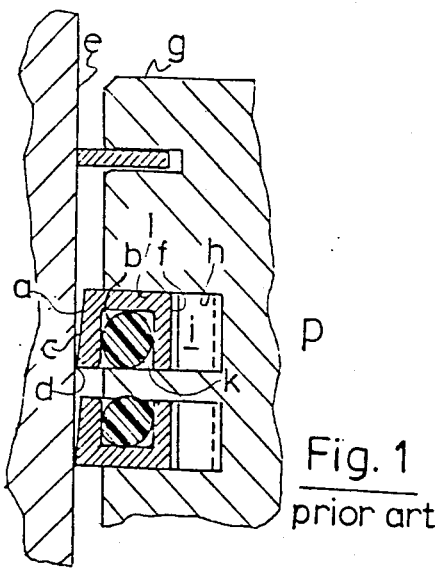
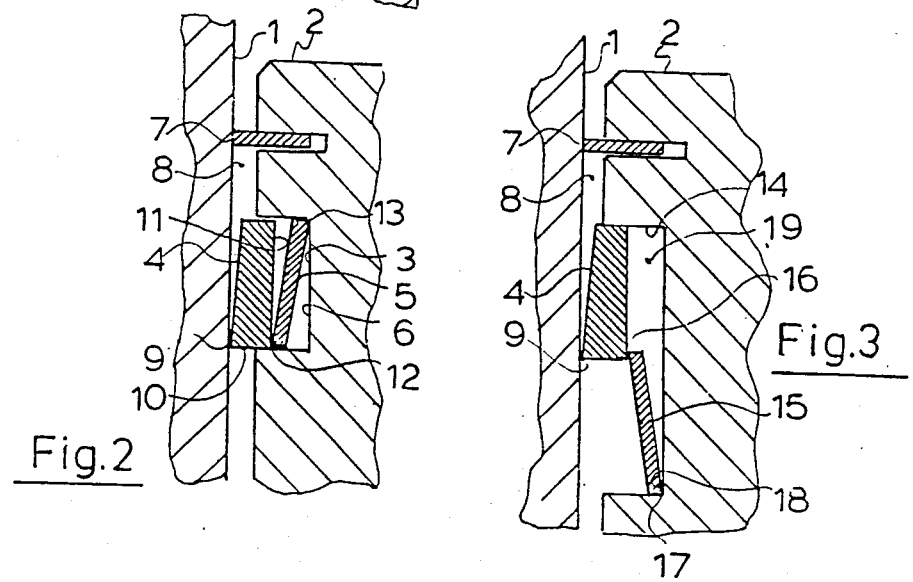

AXIAL OIL SEAL OF A ROTARY PISTON ENGINE

BACKGROUND OF THE INVENTION

1. Field of the Invention

The present invention relates to an axial oil seal of a rotary piston engine, especially a rotary piston internal combustion engine of the trochoidal type of construction, which has a housing consisting of two side plates and a two-lobed or dual-curvature mantle runway; an eccentric shaft passes through the housing and an eccentric of the eccentric shaft has a triangular piston rotating thereon including sealing parts in the corners of the triangular piston in a continuous sliding engagement for gas sealing thereof along the mantle runway and the housing side walls; the oil seal is arranged within the axial gas seal in a groove in the piston; the oil seal consists of at least one sealing ring trapezoidal-shaped in radial cross section and having an oil wiping or scraping edge with spring effect with the oil wiping or scraping edge being pressed against the housing side wall as well as a seal closing-off the groove path.

2. Description of the Prior Art

Such oil seals have a purpose or object to prevent introduction of lubricating oil and cooling oil from the control-drive-gear chambers and bearing chambers into the working or operating chambers also even in the smallest quantities. The sealing rings engage against the housing side wall with a small angle of application or engagement directed radially inwardly, whereby a radially inner boundary or limitation thereof is located at right angles to the housing side wall, from which the wiping or scraping edge results, which pushes oil engaging or located along the housing side wall to move radially inwardly and keeping such oil remote from the working or operating chambers. The springs, which press these sealing rings against the housing side wall, can be wavy springs or disk springs, which mostly engage centrally against the sealing rings and are supported in a groove base of this oil seal. As a seal blocking the leakage path via the groove there are employed O-rings made of elastic material as heat resistant as possible, which O-rings are located or lie between the sealing ring and the groove base or a side wall of the groove.

Known sealing rings of this type have a larger or greater cross section and a rigidity or stiffness to prevent a tilt or pivot effect via the contact pressure or engagement pressure of the spring, especially of a disk or cup spring and always to keep and maintain the engagement or contact angle thereof equal and alike.

SUMMARY OF THE INVENTION

An object of the present invention is to provide a simple and inexpensive oil seal of the type under consideration which permits reduction of oil consumption to a minimum via adaptability to unevenness of the housing side wall and thermal distortions thereof.

This object, and other objects and advantages of the present invention, will appear more clearly from the following specification in conjunction with the accompanying drawings.

BRIEF DESCRIPTION OF THE DRAWINGS

FIG. 1 is a view that shows an axial partial section through a housing of a rotary piston internal combustion engine with an oil seal according to the state of the art;

FIG. 2 is a view that shows an axial partial section through a housing of a rotary piston internal combustion engine with a side inlet having an oil seal with features in accordance with the present invention; and FIG. 3 is a view that shows an axial partial section through a housing of a rotary piston internal combustion engine having an oil seal according to the present invention with peripheral inlet.

DESCRIPTION OF PREFERRED EMBODIMENTS

Referring now to the drawings in detail, an oil seal of an internal combustion engine of the type mentioned in the introductory portion such as illustrated in FIG. 1 according to the most recent state of the art encompasses two sealing rings a that are U-shaped in cross section located sequentially in radial direction, such sealing rings a respectively comprising an elastomeric O-ring b. One U-leg or portion c extends along or is provided with an angle of incidence of approximately 2–3° subject to formation of an oil-wiping or scraping edge d against the housing side wall e; the other U-leg or portion f serves as an abutment or support for wavy springs i mounted or supported in a groove h arranged in a piston g.

The O-ring b presses the sealing ring against the groove wall k and is supported against the other groove wall l, in order to close or shut off the oil-leakage path or course via the groove. In order to be able to receive a sufficiently large O-ring with sufficient or adequate elasticity, the oil-sealing ring must have a greater axial expansion and consequently a corresponding rigidity. Additionally, the O-ring prevents or hinders a freedom of movement of the sealing ring going beyond the limit of elasticity thereof and additionally is heat resistant or thermally stable within limits.

Such oil seals accordingly do not have the possibility to adapt themselves to existing unevenness and unevenness of the housing side wall forming during operation, most of all however not being adaptable to unavoidable heat distortions of the housing in operation, so that the sealing ring can lift away from the housing side wall even if also in a nominal extent and then oil is allowed to pass to the working or operating chambers.

The concern however is directed to avoidance of even the slightest oil passage or leakage. Lubricating oil penetrating into the combustion chambers immediately worsens the exhaust gas values drastically with internal combustion engines. Oil must be avoided basically in the working or operating chambers beyond any necessary minimum quantity needed for lubrication of the sealing parts with air compressors. A best value of oil consumption with the foregoing described oil seal at full load and 5000 revolutions per minute in an hour amounts to 40 grams. Additionally, such seals are complex and costly in the assembly and expensive. With a dual-disk motor, there can be noted that 8 oil sealing rings and 8 O-rings are required with the aforementioned oil seals, whereby the employment of dual seals especially proves in particular the insufficiency, inadequacy or shortcoming thereof.

In contrast, with the oil seal according to the present invention rather than an oil consumption amounting to a value up to 40 grams there are now made possible under the aforementioned conditions with the oil seal according to the present invention that oil consumptions in a range of 5 to 8 grams are made possible under the same conditions as set forth in the foregoing.

FIG. 2 of the drawings representing the illustrated arrangement or embodiment according to the present invention shows the housing side wall 1, the piston 2 and an annular groove 3 provided in the piston 2. The dish or plate spring 5 pressing the sealing ring 4 against the housing side wall 1 supports itself in a radially upper corner of a base 6 of the groove 3. The drawing illustration also shows an axial sealing strip 7 of the gas seal along with an intermediate sealing chamber 8 and an oil-wiping or scraping edge 9.

The sealing ring 4 has a ratio or relationship of 1:3 between an axial underside 10 thereof and a radial rear or backside 11 toward the base 6 of the groove 3. The sealing ring 4 consequently is ductile, flexible, pliable or bendable and adaptable or conformable in relation to the previously known sealing rings. The dish or plate spring 5 in axial direction engages exactly behind the oil-wiping or scraping edge 9 at a location 12 and this provision is made in order to avoid with certainty any tilt, swinging or tipping stress or load of the sealing ring 4, and there is supporting or bracing thereof in a radially outer corner 13 of the base 6 of the groove 3. The dish or plate spring 5 as well as the sealing ring 4 and also the base 6 of the groove is lapped (polished, grind-in abrasively, finishing by lapping) reciprocal or on both sides on engaging surfaces thereof at 12 and 13; via the lapping of these surfaces, there is attained a complete sealing effect, so that an otherwise conventional O-ring can be eliminated.

The planes or surfaces produced during the lapping on the dish or plate spring must be parallel with the planes or surfaces on the sealing ring in the location 12 and on the piston depression in the location 13 as lapped in the installed condition of the oil seal. Consequently, it is purposeful and expedient to lap the dish or plate spring under the same or equal loading as in the installed condition upon a smooth or even disk or plate, which means at equal or identical axial height or level as would occur there.

Even sealing surfaces engaging or lying against each other result thereby, which surfaces completely seal or shut off the leakage path or course of the oil between the sealing ring and the disk or plate spring on the one hand between this and the groove base and with that on the other hand closing or shutting off the leakage path or course via the groove 6. Additionally there results thereby a better capability of movement of the sealing ring relative to the piston.

No gas pressure builds up in the specific embodiment illustrated in FIG. 2 in the intermediate sealing space or chamber 8 as a consequence of the venting via the side inlet; such gas pressure could press the dish or plate spring 5 from the sealing ring 4 at edge location 12. This however arises with the arrangement of a peripheral inlet. For this situation, the arrangement according to FIG. 3 is proposed. In this arrangement according to FIG. 3, the groove 14 is expanded or widened radially inwardly by the width of the dish or plate spring 15; this width is correspondingly smaller in the periphery or circumference than that of the dish or plate spring 5 in FIG. 2. This dish or plate spring 15 now lies or engages with the radially outer edge thereof at a location 16 against an inner lower corner of the sealing strip 4, although again exactly opposite the oil-wiping or scraping edge 9, engaging with the lapped surfaces. The inner 17 of the dish or plate spring 15 likewise is backed or supported again in the lapped surfaces in the radially inner and rear corner of the widened groove 14 at a location 18 and for this the same is true as for the lapping or lobing with the arrangement according to FIG. 2. Gas pressure discharging from the intermediate sealing chamber 8 behind the sealing ring 4 in the groove space or chamber 19 accordingly presses the dish or plate spring 15 against the sealing ring 4 at a location 16. Moreover, the same is true for the specific embodiment of FIG. 4 as set forth with respect to the embodiment of FIG. 2.

Accordingly the present invention relates to an axial oil seal of a rotary piston engine, especially for a rotary piston internal combustion engine of the trochoidal type of construction, which has a housing consisting of two side plates and a dual-curvature mantle runway, which housing has an eccentric shaft passing therethrough and having a triangular piston upon an eccentric of the eccentric shaft, such piston being in a continuous sliding engagement as to the sealing parts providing a gas seal along the mantle runway and running along the housing side walls, which oil seal is arranged within the axial gas seal in a groove in a piston, which consists of at least one sealing ring trapezoidal shaped in radial cross section and including an oil-wiping or scraping edge having a spring effect with the oil wiping edge pressed against the housing side wall as well as a seal closing or shutting off the groove path or course, characterized thereby in that the following features are provided therewith:

(a) The trapezoidal shaped axial cross section of the sealing ring 4 has a ratio in a range of 1:5 to 1:3 in relation to the largest axial width 10 thereof relative to the radial distance or extent 11 thereof;

(b) The dish or plate spring 5, 15 engages in axial direction with the engagement edge 12 thereof against a sealing ring 4 in a radial height or level of the wiping or scraping edge 9; and (c) The contact or engagement surface 12 of the dish or plate spring 5, 15 with respect to the sealing ring 4 and at the base 13, 18 of the groove 3, 4 is lapped both as to the dish or plate spring 5, 15 and also as to the sealing ring 4 and the base 13, 18 of the groove 3, 14.

An oil seal according to the foregoing is further characterized that with a side inlet, the dish or plate spring 5 is arranged rising in the groove 3 behind the sealing ring 4 upon the same or identical radial height or level as that radially outwardly and to the middle and central plane of the piston 2.

The oil seal according to the foregoing is further characterized thereby that with a peripheral or circumferential inlet, the dish or plate spring 15 is arranged drooping or decreasing in a groove 14 widening or expanding radially inwardly by the width of the dish or plate spring 15 as far as to the engagement edge 16 against the sealing ring 4 radially within the sealing ring 4 radially inwardly and toward the middle plane of the piston 2.

The oil seal according to the foregoing is further characterized thereby that the engagement surfaces 12, 16, 13, 18 of the dish or plate spring 5, 15 on the sealing ring 4 and in the groove 6, 14 and likewise the counter surfaces thereof at the sealing ring 4 and the groove 6, 14 are lapped in planes parallel in the installation of the dish or plate spring 5, 15.

The present invention is, of course, in no way restricted to the specific disclosure of the specification and drawings, but also encompases any modifications within the scope of the appended claims.

What we claim is:

1. An axial oil seal of a rotary piston engine, especially of a rotary piston internal combustion engine of trochoidal type of construction, which has a housing consisting of two side plates and a dual-curvature mantle runway, which housing has an eccentric shaft passing therethrough and including a triangular piston upon an eccentric of the eccentric shaft, such piston rotating in continuous sliding engagement of the sealing parts thereof in a gas seal along the mantle runway and the housing side walls thereof, said oil seal being arranged within the axial gas seal in a groove in the piston, which oil seal consists of at least one sealing ring trapezoidal shaped in radial cross section and having an oil wiping and scraping edge with spring effect so that the oil wiping and scraping edge is pressed against the housing side wall as well as a seal closing and shutting off a groove path against oil leakage, comprising, the improvements wherein the following features are provided:

(a) the trapezoidal shaped axial cross section of said sealing ring is in a ratio in a range of 1:5 to 1:3 in the largest axial width thereof with respect to the radial distance thereof;

(b) the plate spring engages in axial direction with an engagement edge thereof against said sealing ring in the radial level of the wiping and scraping edge; and (c) the engaging surface of said plate spring with respect to the sealing ring and at the base of the groove is lapped as to the plate spring and also as to the sealing ring and the base of the groove.

2. An oil seal according to claim 1 wherein, with a side inlet being provided, the plate spring is arranged rising in a groove behind the sealing ring at the same radial level as is applicable radially outwardly and to the central plane of the piston.

3. An oil seal according to claim 1 wherein, with a peripheral-circumferential inlet, the plate spring is arranged decreasing in a groove expanding and widening radially inwardly by amount of width of the plate spring as far as to the engaging edge against the sealing ring radially within the sealing ring radially inwardly and toward the central plane of the piston.

4. An oil seal according to claim 1, wherein engagement surfaces of the plate spring at the sealing ring and in the groove as well as in the counter surfaces thereof on the sealing ring and the groove are lapped in planes parallel in the installation of said plate spring.

* * * * *